US008446339B2

(12) United States Patent
Tomisawa et al.

(10) Patent No.: US 8,446,339 B2
(45) Date of Patent: May 21, 2013

(54) IMAGE DISPLAY DEVICE

(75) Inventors: Isao Tomisawa, Tsurugashima (JP); Masaru Ishikawa, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 736 days.

(21) Appl. No.: 12/594,077

(22) PCT Filed: Mar. 30, 2007

(86) PCT No.: PCT/JP2007/057192
§ 371 (c)(1),
(2), (4) Date: Mar. 16, 2010

(87) PCT Pub. No.: WO2008/126283
PCT Pub. Date: Oct. 23, 2008

(65) Prior Publication Data
US 2010/0182219 A1    Jul. 22, 2010

(51) Int. Cl.
*G09G 5/00* (2006.01)
(52) U.S. Cl.
USPC ..................................... 345/4; 345/1.1; 345/7
(58) Field of Classification Search
None
See application file for complete search history.

(56) References Cited

U.S. PATENT DOCUMENTS

| | | | | |
|---|---|---|---|---|
| 2002/0126396 | A1* | 9/2002 | Dolgoff | 359/743 |
| 2004/0125202 | A1* | 7/2004 | Tomisawa et al. | 348/14.07 |
| 2004/0135741 | A1* | 7/2004 | Tomisawa et al. | 345/6 |
| 2004/0223379 | A1* | 11/2004 | Tomisawa | 365/200 |
| 2005/0156813 | A1* | 7/2005 | Adachi et al. | 345/1.3 |
| 2005/0185276 | A1* | 8/2005 | Tomisawa et al. | 359/472 |
| 2007/0146267 | A1* | 6/2007 | Jang et al. | 345/88 |
| 2007/0171493 | A1* | 7/2007 | Nakanishi | 359/15 |
| 2007/0195064 | A1* | 8/2007 | Morioka | 345/173 |
| 2008/0192111 | A1* | 8/2008 | Ijzerman | 348/51 |

FOREIGN PATENT DOCUMENTS

| | | |
|---|---|---|
| JP | 59-120185 | 7/1984 |
| JP | 2001-255493 | 9/2001 |
| JP | 2003-098479 | 4/2003 |
| JP | 2005-234240 | 9/2005 |
| JP | 2006-171042 | 6/2006 |
| JP | 2006-309017 | 11/2006 |

OTHER PUBLICATIONS

International Search Report for PCT/JP2007/057192, mailed Jun. 12, 2007.

* cited by examiner

*Primary Examiner* — Amare Mengistu
*Assistant Examiner* — Antonio Xavier
(74) *Attorney, Agent, or Firm* — Nixon & Vanderhye P.C.

(57) ABSTRACT

In an image display device, a floating image display unit focuses light left from an image screen on an image plane in a space to display a floating image. The space is located on one side of an image transfer panel opposite to the other side thereof facing a display unit. A direct-view image display unit includes a display unit having an image screen on a plane orthogonal or oblique to the image plane from a periphery of the image plane and outputs, in a first direction far from the image transfer panel and in a second direction close thereto, two-dimensional images, respectively. A reflection and pass unit reflects part of the light left from the display unit in the second direction toward a direction far from the image transfer panel, and allows part of the light left from the display unit to pass therethrough.

7 Claims, 13 Drawing Sheets

(a)

(b)

(a)

(b)

IMAGE DISPLAY DEVICE

This application is the U.S. national phase of International Application No. PCT/JP2007/057192, filed 30 Mar. 2007, which designated the U.S., the entire contents of which is hereby incorporated by reference.

TECHNICAL FIELD OF THE INVENTION

The present invention relates to image display devices for pseudo-stereoscopically displaying two-dimensional images.

BACKGROUND ART

An image display device, in which an image transfer panel (for example, a microlens array consisting of a plurality of lenses) is placed in front of a two-dimensional image at a predetermined space therefrom, for displaying a pseudo stereoscopic image (floating image) of the two-dimensional image onto a space in front of the image transfer panel has been known (for example, see a first patent document and a second patent document). The image display device is adapted to focus the two-dimensional image by the image transfer panel while floating the two-dimensional image, thus displaying the two-dimensional image as if to display a three-dimensional image.

These image display devices include an image display device equipped with two screens for two-dimensional images; this image display device causes images displayed on one of the screens to be recognized as pseudo-stereoscopic images of the two-dimensional images, and causes images displayed on the other of the screens to be recognized as direct-view images (for example, see a third patent document).

First patent document: Japanese Patent Laid-Open No. 2001-255493
Second patent document: Japanese Patent Laid-Open No. 2003-098479
Third patent document: Japanese Patent Laid-Open No. 2005-234240

DISCLOSURE OF THE INVENTION

Problems to be Solved by the Invention

The image display device equipped with the two screens for two-dimensional images is able to display combined images of direct-view images and floating images, making it possible to increase stereoscopic visual effects.

However, in an image display that interlocks a direct-view image and a floating image, an increase in stereoscopic visual effects provides users more realistic images.

The present invention has been made in view of the aforementioned circumstances, and has an example of a purpose of providing an image display device capable of strengthening the interlock between a direct-view image and a floating image, thus more increasing stereoscopic visual effects.

Means for Solving the Problems

In order to achieve such a purpose provided above, an image display device according to a first aspect of the invention includes a first display unit having a first image screen for displaying a two-dimensional image; and an image transfer panel located far from the first image screen, including: a floating image display means that focuses light left from the first image screen on an imaging plane in a space to thereby display a floating image, the space being located on one side of the image transfer panel opposite to the other side thereof facing the first display unit; and a direct-view image display means including: a second display unit having a second image screen on a plane orthogonal or oblique to the imaging plane from a periphery of the imaging plane and adapted to output, in a first direction far from the image transfer panel and in a second direction close thereto, two-dimensional images, respectively; and a reflection and pass unit located close to the image transfer panel and adapted to: reflect part of light left from the second display unit in the second direction toward a direction far from the image transfer panel; and allow part of the light left from the first display unit to pass therethrough.

DESCRIPTION OF CHARACTERS

Figure 1:
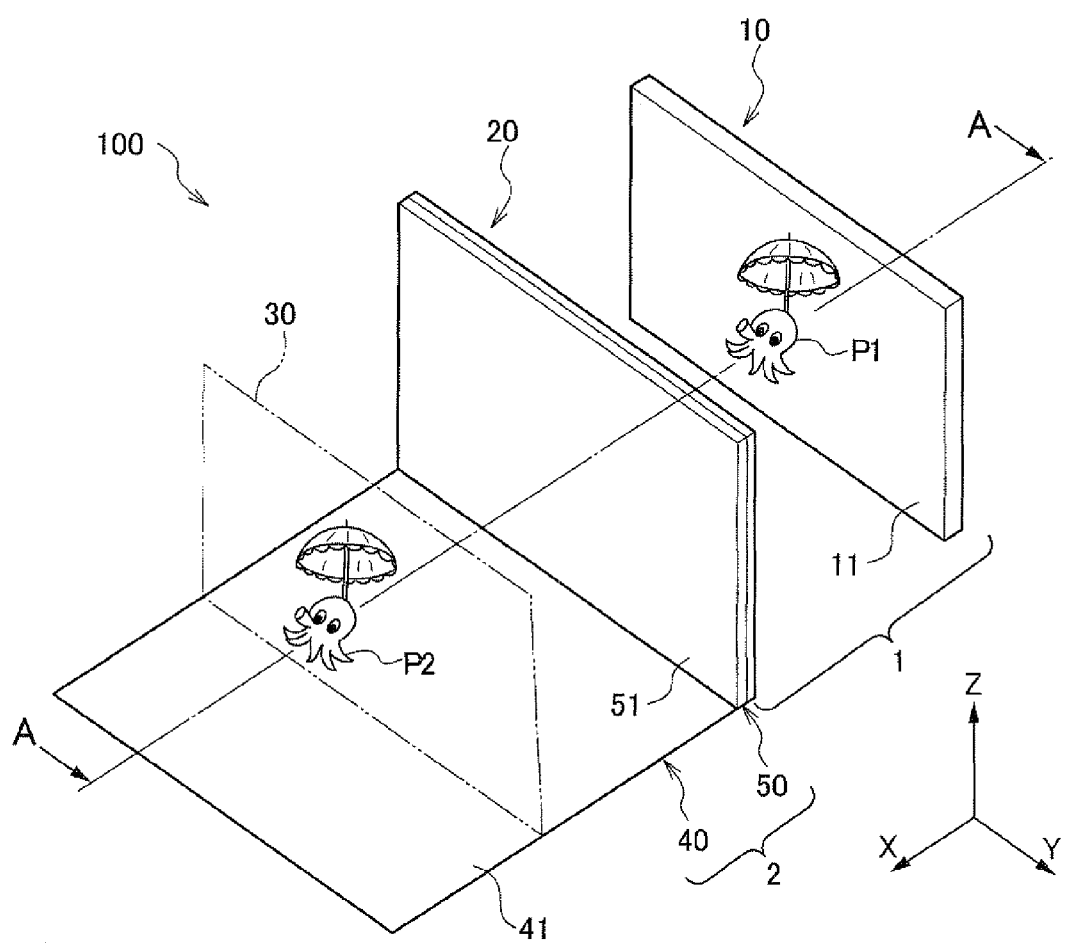
FIG. 1 is an outline perspective view of an image display device according to an embodiment of the present invention.

1 Floating image display unit
2 Direct-view image display unit
3 Image controller
10, 40 Display unit
11, 41 Image screen
12, 42 Display driver
20 Image transfer panel
21 Lens array half 22 Transparent substrate
23 Micro convex lens
25 Microlens array
30 Imaging plane
43 Sensor driver
50 Half mirror
100, 100A, 100B, 100C Image display device

BEST MODES FOR CARRYING OUT THE
INVENTION

An embodiment of the present invention will be described hereinafter with reference to the drawings.

Figure 2:
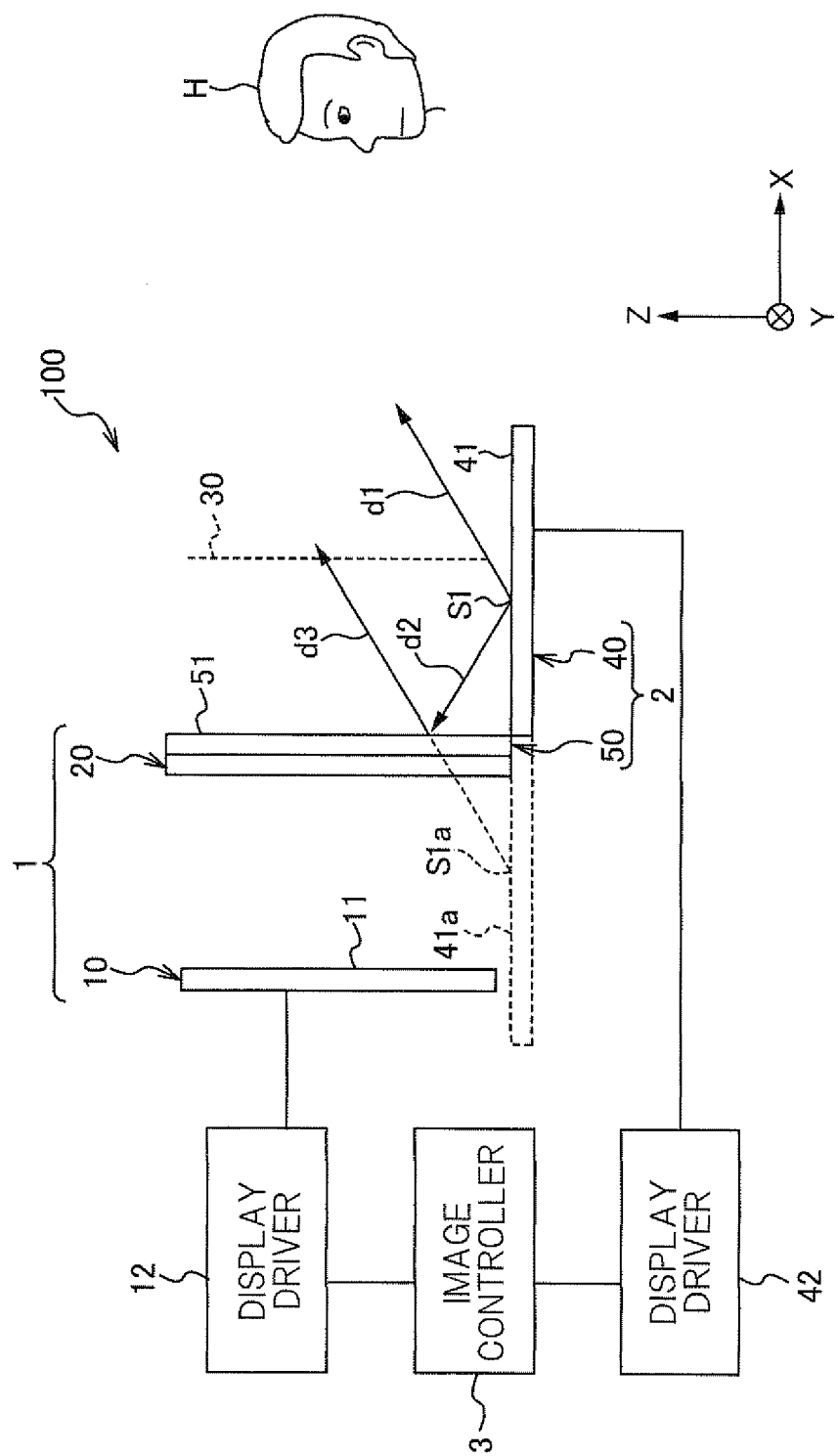
FIG. 2 is a functional structural view of the image display device according to the embodiment of the present invention.

FIGS. 1 and 2 are schematically structural views of an image display device 100 according to an embodiment of the present invention. FIG. 1 is an outline perspective view of the image display device 100, and FIG. 2 is a cross sectional view of the image display device 100 as viewed from its lateral direction (A-A direction of FIG. 1).

The image display device 100 is a pseudo stereoscopic-image display device for displaying, on a preset plane in a space, two-dimensional images that are visibly recognizable by a viewer H as pseudo stereoscopic images. The image display device 100 is provided with a floating image display unit 1 for displaying floating images (two-dimensional images to be displayed on a preset plane in a space), and a direct-view image display unit 2 for displaying direct-view images that are directly viewed by the viewer H.

The floating image display unit 1 is made up of a display unit 10, and an image transfer panel 20 located to be spaced from the display unit 10. The display unit 10 is equipped with an image screen 11 for displaying two-dimensional images, and with a display driver 12 for drive and control of the display unit 10. The display unit 10 displays, on the image screen 11, an image according to drive signals of the display driver.

Specifically, as the display unit 10, a color liquid crystal display (LCD) can be used, which is provided with a flat screen 11 and a display driver 12 consisting of an illuminating backlighting unit and a color liquid crystal drive circuit. Note that another device except for the LCD, such as an EL (Electro-Luminescence) display, a plasma display, CRT (Cathode Ray Tube), or the like, can be used.

Figure 3:
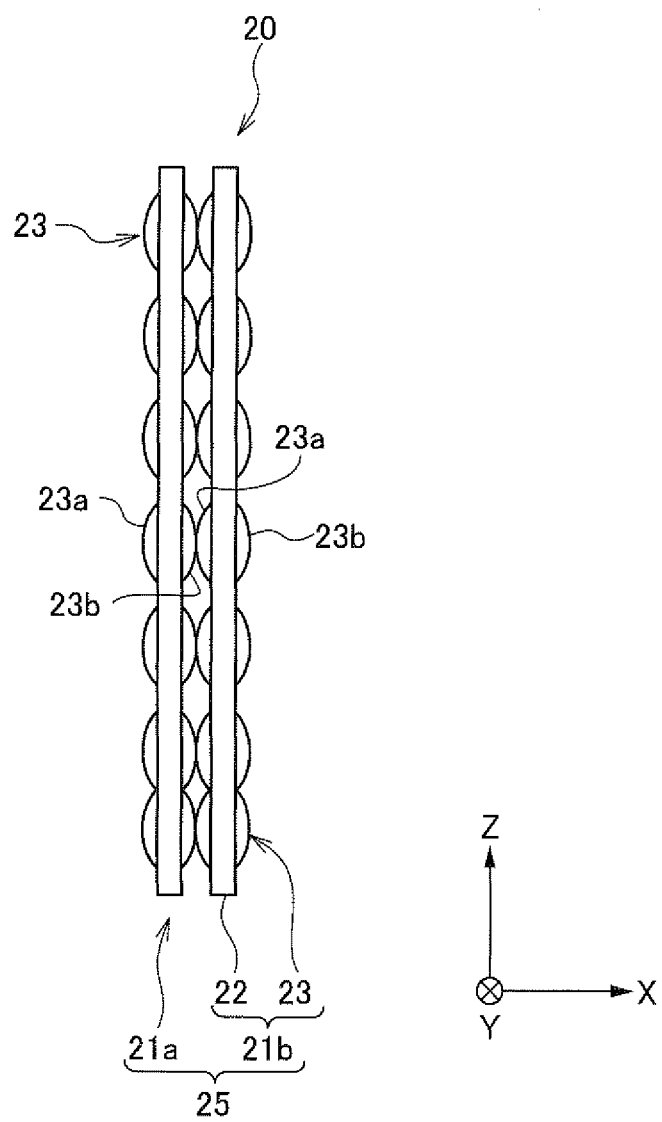
FIG. 3 is a structural view of the image display device according to the embodiment of the present invention.

The image transfer panel 20 includes, for example, a microlens array 25 with a panel screen arranged in substantially parallel to the image screen 11 of the display unit 10. The microlens array 25, as illustrated in FIG. 3, is configured such that two lens array halves 21a, 21b are arranged in parallel to each other. Each of the lens array halves 21a, 21b is designed such that a plurality of micro convex lenses 23 are two-dimensionally arranged to be adjacent to each other on either surface of a transparent substrate 22 made from high translucent glass or resin; the micro convex lenses 23 have the same radius of curvature.

An optical axis of each of the micro convex lenses 23a formed on one surface is adjusted such that the adjusted optical axis is aligned with the optical axis of a corresponding micro convex lens 23b formed at an opposing position on the other surface. Specifically, individual pairs of the micro convex lenses 23a, 23b adjusted to have the same optical axis are two-dimensionally arranged such that their respective optical axes are parallel to each other.

The microlens array 25 is placed in parallel to the image screen 11 of the display unit 10 at a position far therefrom by a predetermined distance (a working distance of the microlens array 25). The microlens array 25 is adapted to focus light, corresponding to an image and left from the image screen 11 of the display unit 10, on an imaging plane 30 on the side opposite to the image screen 11 and far therefrom at the predetermined distance (working distance of the microlens array 25). This displays the image displayed on the image screen 11 on the imaging plane 30 as a two-dimensional plane in a space.

The formed image is a two-dimensional image, but is displayed to float in the space when the image has depth or the background image on the display is black with its contrast being enhanced. For this reason, the viewer H looks the formed image as if it is floated. Note that the imaging plane 30 is a virtually set image in the space and not a real object, and one plane defined in the space according to the working distance of the microlens array 25.

Figure 4:
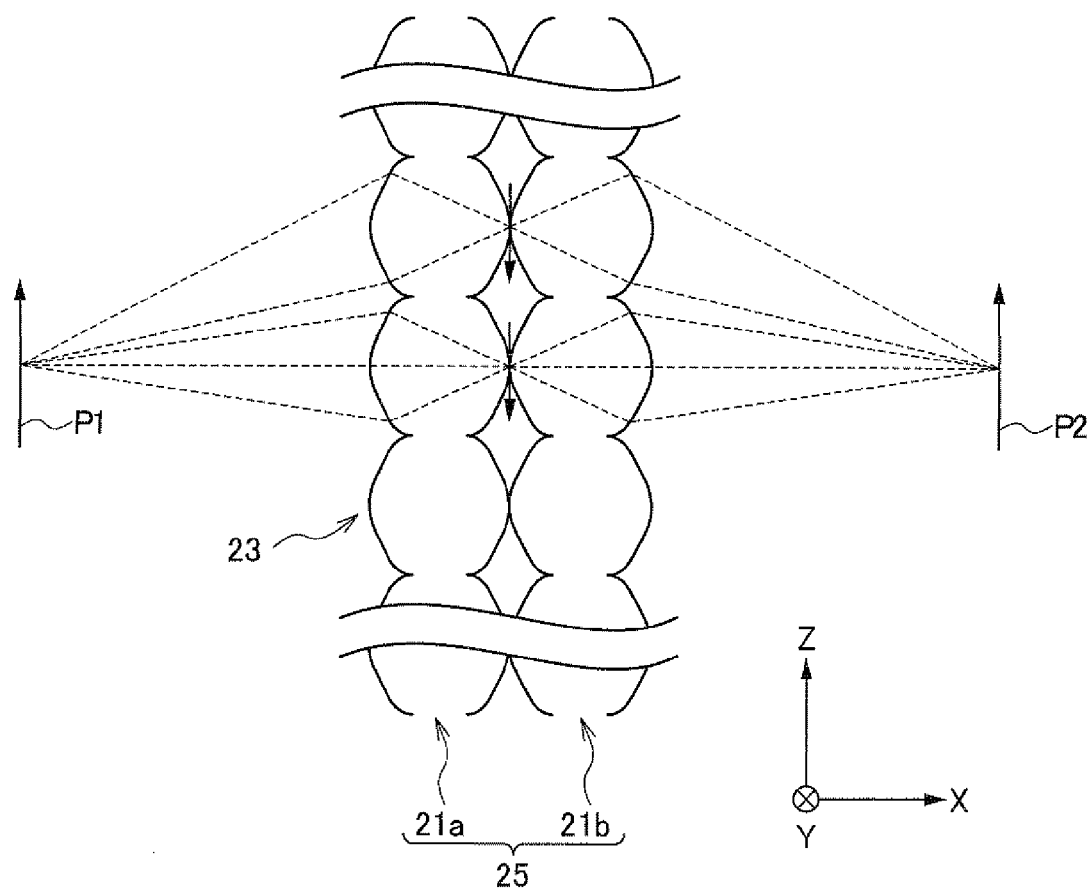
FIG. 4 is a view describing optical operations of a microlens array that is the image display device according to the embodiment of the present invention.

The microlens array 25, as illustrated in FIG. 4, is adjusted to be arranged such that:

light corresponding to an image P1 and left from the image screen 11 of the display unit 10 is incident from the lens array half 21a, flipped thereinside at one time, flipped again, and thereafter, outputted from the lens array half 25b.

This allows the microlens array 25 to display the two-dimensional image P1 displayed on the image screen 11 of the display unit 10 as an erected floating image P2 on the imaging plane 30.

More specifically, in the light forming the two-dimensional image P1 to be displayed on an image screen 11a, light of an image in a region corresponding to each of the micro convex lenses 23 of the microlens array 25 is captured by each of the micro convex lenses 23, flipped in each of the micro convex lenses 23, flipped again, and outputted so that the floating image P2 is displayed as a set of erected images formed by the respective micro convex lenses 23.

Figure 5:
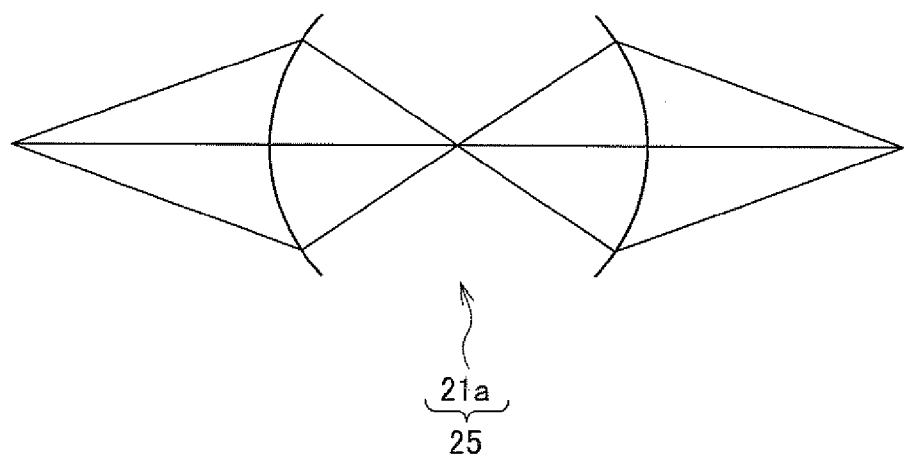
FIG. 5 is a view describing optical operations of a microlens array having a structure different from that of the microlens array illustrated in FIG. 4.
Figure 5:
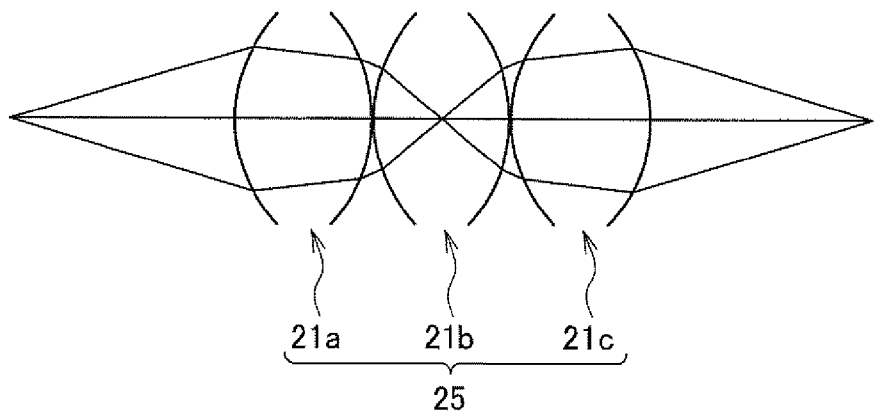

Note that the microlens array 25 is not limited to the structure of a pair of two lens array halves 21a, 21b, and can be configured by a single lens array, or by a plurality of lens arrays equal to or greater than three lens arrays. Of course, when a floating image is formed by odd-numbered, such as one or three, lens array halves 21, referring to (a) and (b) of FIG. 5, light incident to the micro lens array 25 is flipped at one time therein, and flipped again. For this reason, it is possible to display an erected floating image. As described above, various configurations of the microlens array 25 can be made. These configurations allow the working distance for forming light to have a constant effective range without limiting the single working distance.

Note that, in the embodiment, the image transfer panel 20 is the microlens array 25, but not limited thereto, and can be any member for forming erected images, desirably erected equal-magnification images, such as other forms of lenses, or mirrors or prisms; these mirrors or prisms form erected equal-magnification images. For example, a gradient index lens array, a GRIN lens array, a rod lens array, or the like can be a microlens array, and a roof mirror array, a corner mirror array, a dove prism or the like can be a micromirror array. One Fresnel lens having a required active area, which forms a reverted image, can be used in place of arrays.

The direct-view image display unit 2 is made up of a display unit 40, and a half mirror 50 for reflecting light left from the display unit 40. As well as the display unit 10, the display unit 40 is equipped with an image screen 41 for displaying two-dimensional images, and with a display driver 42 for drive and control of the display unit 40. The display unit 40 displays, on the image screen 41, an image according to drive signals of the display driver.

Specifically, as the display unit 40, a color liquid crystal display (LCD) can be used, which is provided with a flat screen 41 and a display driver 42 consisting of an illuminating backlighting unit and a color liquid crystal drive circuit. Note that another device except for the LCD, such as an EL (Electro-Luminescence) display, a plasma display, CRT (Cathode Ray Tube), or the like, can be used.

The image screen 41 of the display unit 40 is so placed at a region in front of the image transfer panel 20 (the side of the imaging plane 30) under the floating image P2 in substantially orthogonal to the imaging plane 30 as to allow the viewer H to directly view an image displayed on the image screen 41. Note that, in the embodiment, the image screen 41 is arranged under the floating image, but the arrangement of the image screen 41 is not limited thereto. The image screen 41 can be placed at any one of an upper side, a lower side, a left side, and a right side of the floating image, or can be placed simultaneously at any plurality of the upper side, the lower side, the left side, and the right side of the floating image.

Moreover, the display unit 40, as illustrated in FIG. 2, is an LCD from which light can exit in different directions, and is adapted such that light is left from the image screen 41 in both first direction d1 (a direction far from the image transfer panel 20: +X direction) and second direction d2 (a direction close to the image transfer panel 20: −X direction). Note that light left in the first direction d1 will be referred to as "first light", and an image outputted and displayed based on the first light will be referred to as "first image". Similarly, light left in the second direction d2 will be referred to as "second light", and an image outputted and displayed based on the second light will be referred to as "second image". Information to be displayed by the first image and that to be displayed by the second image can be different from each other, or can be associated with each other.

Figure 6:
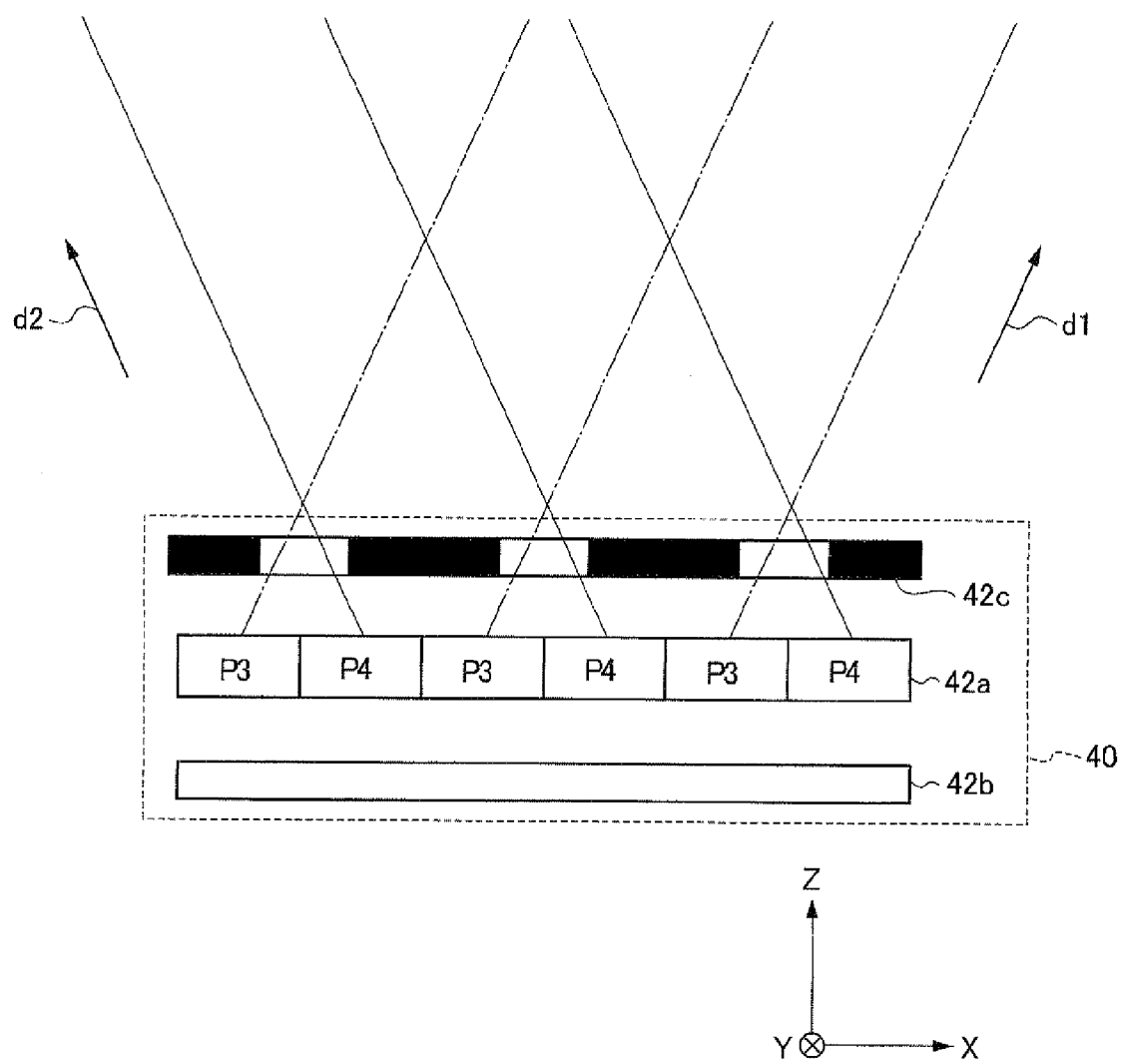
FIG. 6 is a view describing a principle of the image display device according to the embodiment of the present invention for exiting light in different two directions.

Let us simply describe a principle of a liquid crystal display from which light can exit in different directions with reference to FIG. 6. Note that the display unit 40 according to the embodiment adopts a parallax barrier system illustrated in FIG. 6, but another system, such as a time division system, can be adopted.

The display unit 40, as illustrated in FIG. 6, includes: a liquid crystal display unit 42a that alternately arranges and displays a first image P3 and a second image P4 pixel by pixel in a front-back direction (X direction) of the viewer H, a backlight 42b that irradiates illumination light from the back of the liquid crystal display unit 42a, and a parallax barrier unit 42c that controls the direction of light left from the liquid crystal display unit 42a.

The parallax barrier unit 42c is formed such that light transmissive areas and light blocking areas are formed in stripes in the front-back direction. For this reason, the first image P1 and the second image P2 left from the liquid crystal image unit 42a with their directions of light controlled are displayed and outputted in the first direction d1 and the second direction d2, respectively. Note that angles of the first and second directions d1 and d2 can be changed depending on the width of the light blocking areas.

The half mirror 50 is arranged vertically adjacent to the front side (imaging plane 30 side) of the image transfer panel 20, and a half mirror surface 51 of the half mirror 50 and the image screen 41 of the image display unit 40 are substantially vertically arranged. These configurations allow the half mirror 50 to:

reflect some of light left from the image screen 41 of the image unit 40 in the second direction d2 toward a third direction d3; and allow some of light displayed as a floating image and left from the image screen 11 of the display unit 10 to pass therethrough. For this reason, the viewer H can view the first light left in the first direction d1 as a direct-view image, view the second light reflected by the half mirror 50 in the third direction d3, and, at the same time, view, as a floating image, the light left from the image screen 11 and passing through the half mirror 50.

In this case, it seems to the viewer H as if the second image based on the second light is outputted and displayed on an image display plane 41a (a virtual plane 41a) located symmetrically with respect to the image screen 41 and the half mirror 51 (it appears that the second light left from S1 is left from S1a). For this reason, the direct-view image has depth in the front-back direction.

Specifically, even if the image screen 41 is actually placed in front of the image transfer panel 20, it is possible to achieve a same advantage achieved when the image screen 41 is placed at the back of the image transfer panel 20 (the display unit 10 side), in other words, to double the image screen 41 toward the back side, thus improving the expressive power of the direct-view image.

Note that the half mirror 50 needs to reflect some of light incident thereto and allow the remaining light to pass therethrough, and therefore, each of the reflection factor and the transmission factor need not be 50%.

An image controller 3 is adapted to generate image data to be displayed on the display units 10 and 40, and carry out image-display control to thereby interlock the image data to be displayed on the display unit 10 and the image data to be displayed on the display unit 40. For example, change in the display image to be displayed on the display unit 40 with change in the display image to be displayed on the display unit 10 or change in the display image to be displayed on the display unit 10 with change in the display image to be displayed on the display unit 40 interlock a floating image and a direct-view image, thus enhancing stereoscopic visual effects. Note that, for the generation of image data, an image storage unit in which predetermined images have been stored can be provided.

Figure 7:
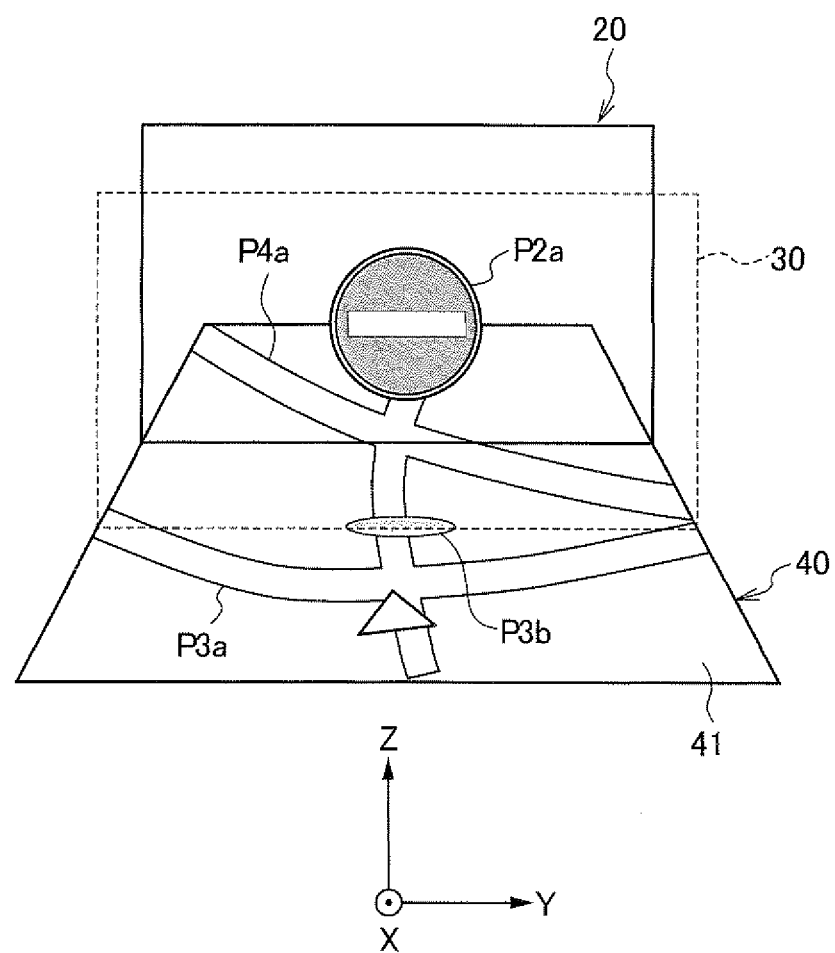
FIG. 7 is an example of images that the image display device according to the embodiment of the present invention displays.

FIG. 7 schematically illustrates an example of images that the image display device 100 displays. The images illustrated in FIG. 7 are car navigation images. A traffic control sign P2a as a floating image, maps P3a and P4a as direct-view images, and a shadow P3b of the traffic control sign P2a are displayed. Thus, the floating image and the direct-view images are images associated with each other, and interlocking the floating image and the direct-view images increases stereoscopic visual effects.

Note that, in the images illustrated in FIG. 7, the first image P3 and the second image P4 as the direct-view images are different from each other, and the combination of the first image P3 and the second image P4 expresses one completed direct-view image. Specifically, the map information P3a of the first image and the map information P4a of the second image are smoothly spanned in the front-back direction so as to show one map information, thus providing the map information an illusion of depth. As described above, the image display device 100 widens an area for recognizing the direct-view images toward the back. This increases the interlock with the floating image, making it possible to further increases stereoscopic visual effects.

Figure 8:
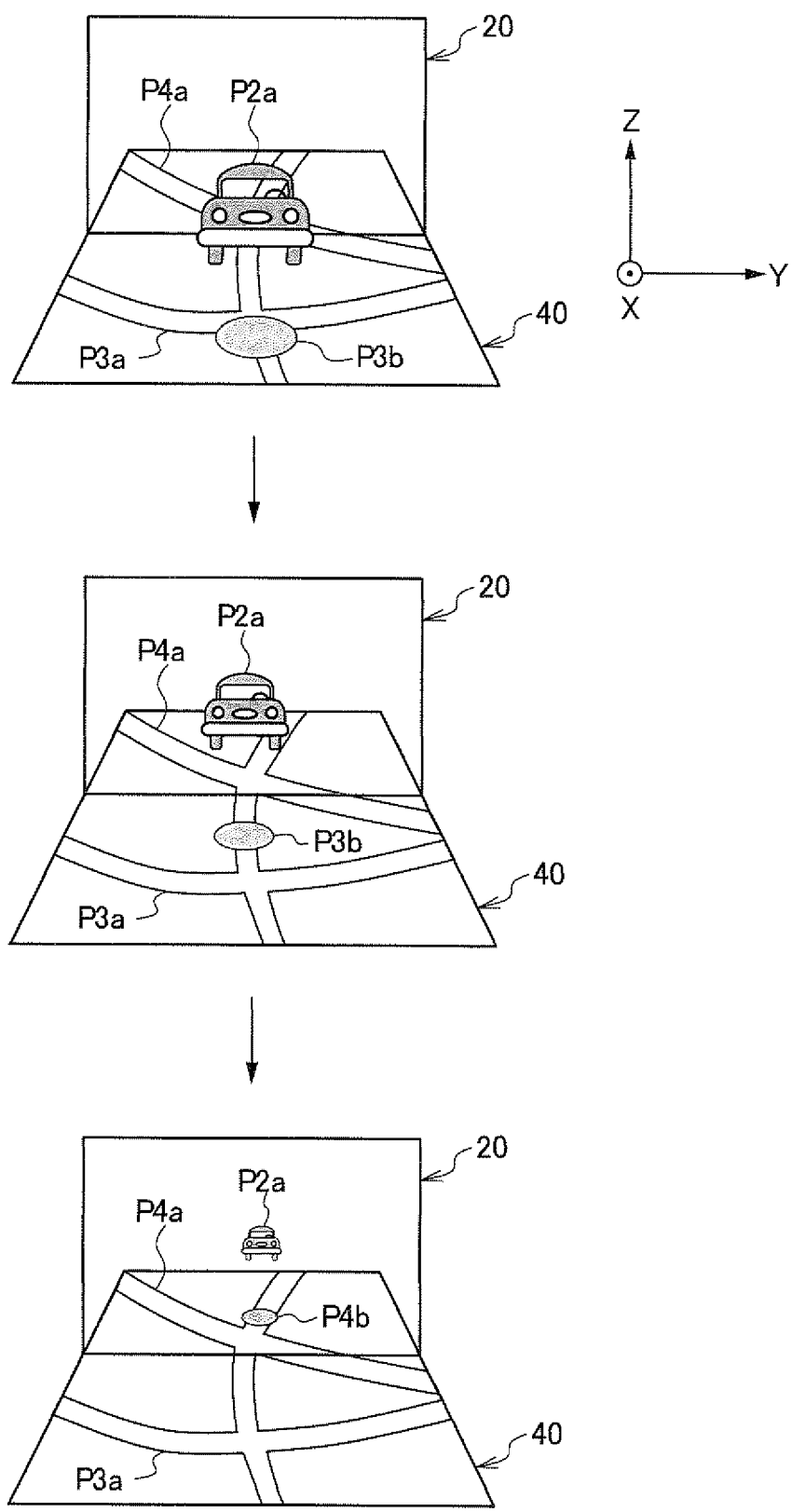
FIG. 8 is an example of images that the image display device according to the embodiment of the present invention displays.

FIG. 8 schematically illustrates another example of images that the image display device 100 displays. The images illustrated in FIG. 8 are also car navigation images. A motor vehicle P2a as a floating image, maps P3a and P4a as direct-view images, and a shadow P3b of the motor vehicle P2a are displayed. In FIG. 8, the shadow P3b of the motor vehicle as the direct-view image is gradually reduced in size with gradual reduction in size of the motor vehicle P2a as the floating image so that the shadow P3b moves to the back side on the map (the shadow of the motor vehicle moves from the first image P3b to the second image P4b). For this reason, it is possible for the viewer H to feel that the motor vehicle P2a moves from the near side to the far side.

Figure 9:
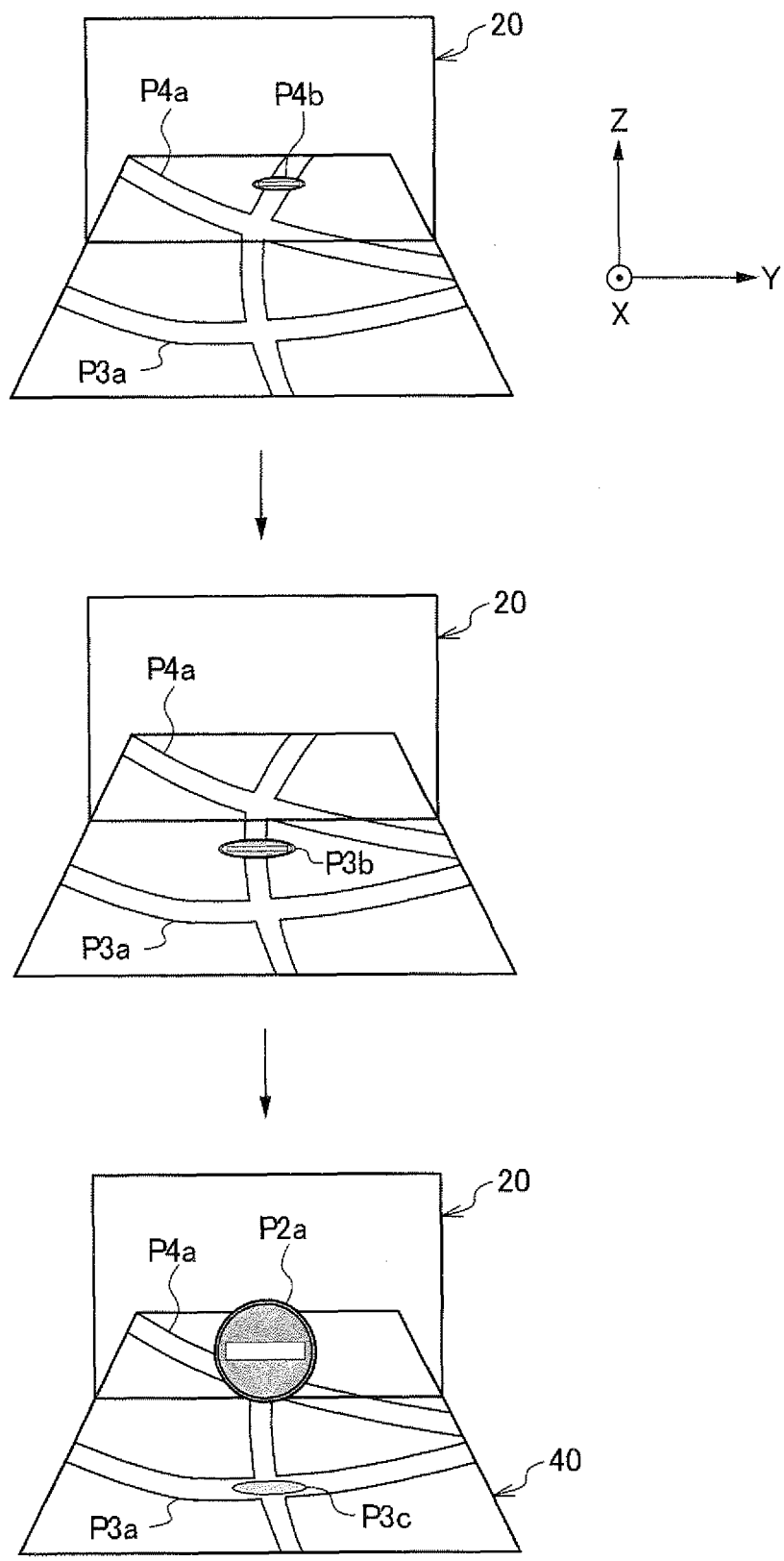
FIG. 9 is an example of images that the image display device according to the embodiment of the present invention displays.

FIG. 9 schematically illustrates a further example of images that the image display device 100 displays. The images illustrated in FIG. 9 are also car navigation images. A traffic control sign P2a as a floating image, maps P3a and P4a as direct-view images, and a shadow P3c of the motor vehicle P2a are displayed. In FIG. 9, when the traffic control sign P2a moves on the map from the far side to the near side so as to reach a predetermined position, the traffic control sign is changed from the direct-view image to the floating image so that it is displayed to be popped up.

As described above, the image display device 100 according to the embodiment provides a direct-view image an illusion of depth, changes the direct-view image according to the change in a floating image (see FIG. 8), and changes the floating image according to the change in the direct-view image (see FIG. 9). For this reason, it is possible to provide the viewer H stereoscopic visual effects that interlock the floating image and the direct-view image.

Figure 10:
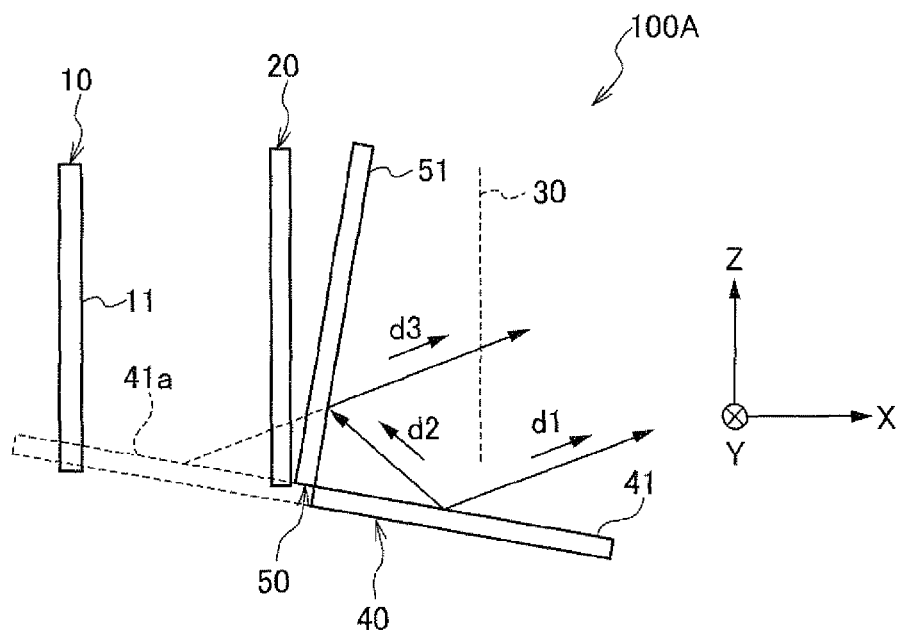
FIG. 10 is a structural view of a modification 1 of the image display device according to the embodiment of the present invention.
Figure 12:
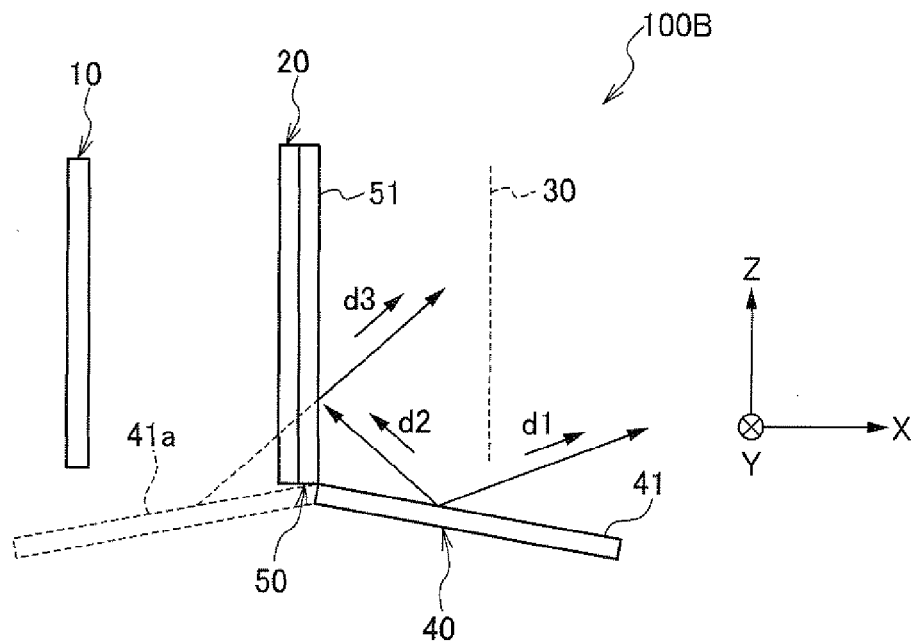
FIG. 12 is a structural view of a modification 2 of the image display device according to the embodiment of the present invention.

Note that the aforementioned image display device 100 locates the image screen 41 of the display unit 40 in parallel to the ground, but can locate the image screen 41 of the display unit 40 to be inclined to the ground. FIGS. 10 and 12 are schematic structural views of image display devices in which their image screens 41 are inclined to the ground.

FIG. 10 is an outline side view of an image display device 100A when the image screen 41 of the image display unit 40 is inclined to the ground, and the half mirror surface 51 of the half mirror 50 and the image screen 41 of the image display unit 40 are substantially formed vertically. Specifically, the image screen 11 of the display unit 10 and the panel surface of the image transfer panel 20 are arranged vertically to the ground, and there is an obtuse angle required between the panel surface of the image transfer panel 20 and the image screen 41 of the image display unit 40.

Referring to FIG. 10, the half mirror 50 is arranged closely at the front side of the image transfer panel 20, and the image transfer panel 20 and the half mirror 50 are arranged in non-parallel to each other. In this case, because the image screen 41 and the image display plane 41a (a virtual plane 41a) are formed on a same plane, the viewer H views a direct-view image displayed on one inclined plane.

Figure 11:
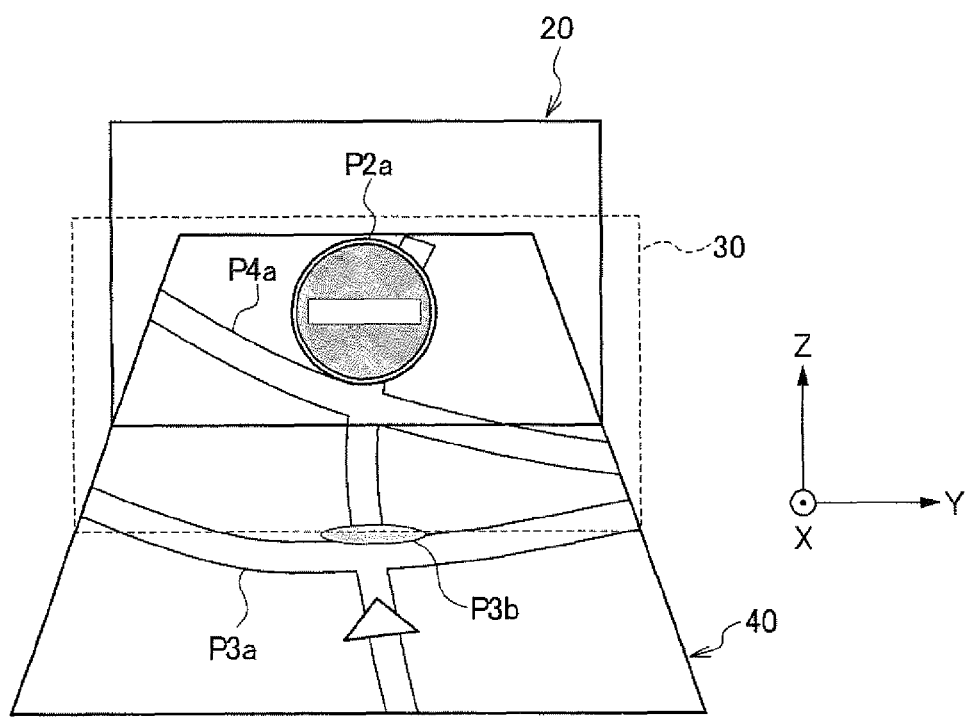
FIG. 11 is an example of images that the image display device illustrated in FIG. 10 displays.

FIG. 11 illustrates an example of images that the image display device 100A displays. The contents of the images are car navigation images as well as FIG. 7, and, in the case of the image display device 100A, the direct-view image can be seen on the plane that rises from the near side to the far side. For this reason, the map as the direct-view image can be more easily seen.

FIG. 12 is an outline side view of an image display device 100B when the image screen 41 of the image display unit 40 is inclined to the ground, and the half mirror surface 51 of the half mirror 50 is designed to be adjacent to the panel surface of the image transfer panel 20. Specifically, the image screen 11 of the display unit 10 and the panel surface of the image transfer panel 20 are arranged vertically to the ground, and there is an obtuse angle formed between the panel surface of the image transfer panel 20 and the image screen 41 of the image display unit 40. An obtuse angle is also formed between the image screen 41 of the image display 40 and the half mirror surface 51 of the half mirror 50.

In this case, the image screen 41 and the image display plane 41a (a virtual plane 41a) are non-coplanar with each other, and two planes bent to form a crest are formed. For this reason, the viewer H views a direct-view image displayed on the two planes bent in crest shape.

Figure 13:
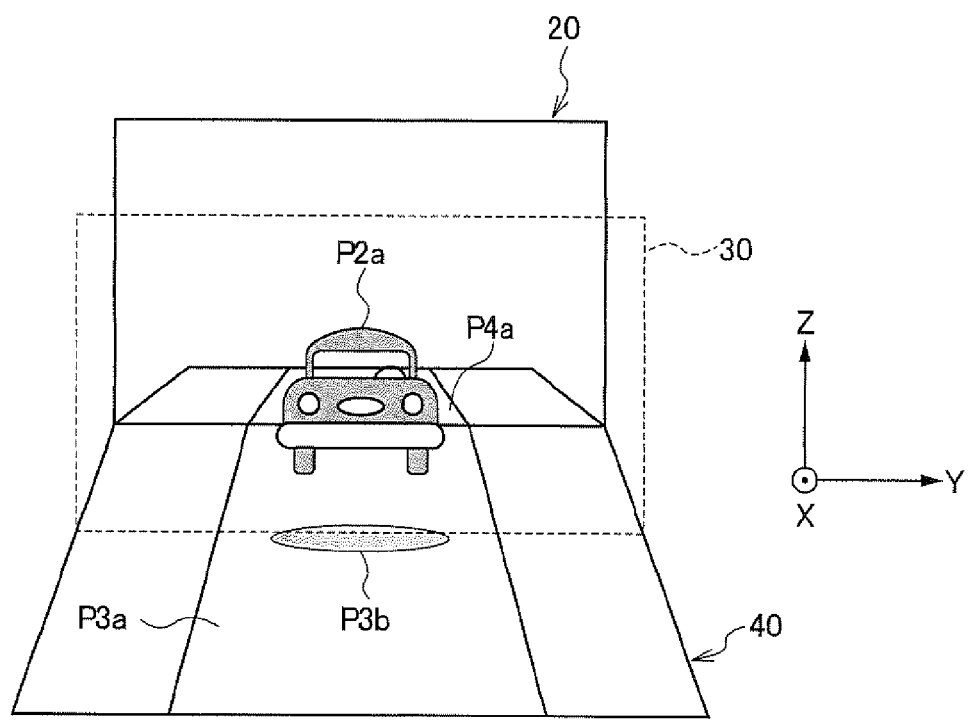
FIG. 13 is an example of images that the image display device illustrated in FIG. 12 displays.

FIG. 13 illustrates an example of images that the image display device 100B displays. The contents of the images are car navigation images as well as FIG. 8, and, in the case of the image display device 100B, because a crest terrain as the direct-view image can be expressed, it is possible to provide the viewer H a feeling of going over a mountain. In this case, for example, the shade P3b of the vehicle as the direct-view image can be controlled to move toward the far side on the map, and the vehicle P2a as the floating image can be controlled to move vertically along the inclination of the image screen 41 or the image display plane 41a (vertical plane 41a).

Note that other variations can be applied to image display devices with the image screen 41 being inclined to the ground. For example, an acute angle can be formed between the image screen 41 of the image display unit 40 and the half mirror surface 51 of the half mirror 50. In this case, a trough terrain can be expressed contrary to an image displayed by the image display device 100B. In addition, the inclination of the image screen 41 is not always fixed to a constant angle, but the angle of the inclination of the image screen 41 can be moved. For example, for car navigation images, the angle of the inclination of the image screen 41 can be moved along an actual terrain.

Figure 14:
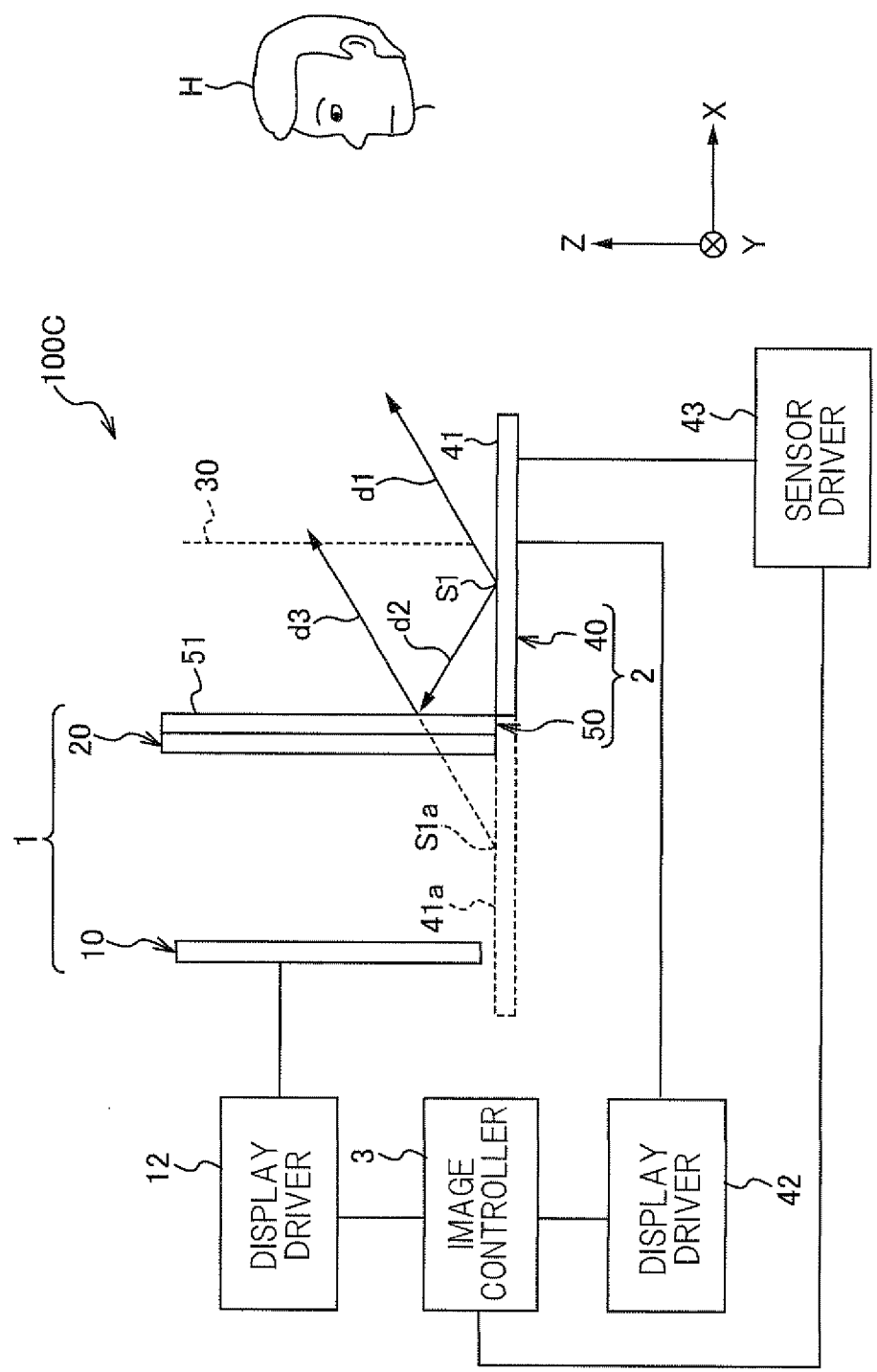
FIG. 14 is a functional structural view of a modification 3 of the image display device according to the embodiment of the present invention.

Moreover, a sensor unit, such as a touch panel, can be mounted on the image screen 41 of the image display device 100 according to the embodiment. FIG. 14 is a functional structural view of such an image display device 100C. The image display device 100C, in addition to the structure of the image display device 100, is provided with a sensor driver 43 that drives the sensor unit and receives a detection signal detected by the sensor unit. Specifically, the operations of the viewer H are detected by the sensor unit on the image display screen 41, and the floating image and the direct-view image are changed according to the detected signal.

Figure 15:
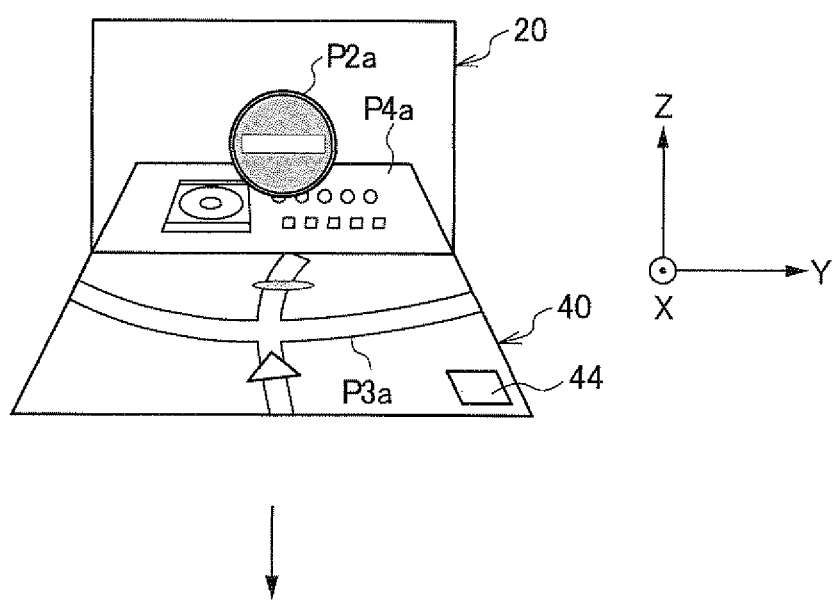
FIG. 15 is an example of images that the image display device illustrated in FIG. 14 displays.
Figure 15:
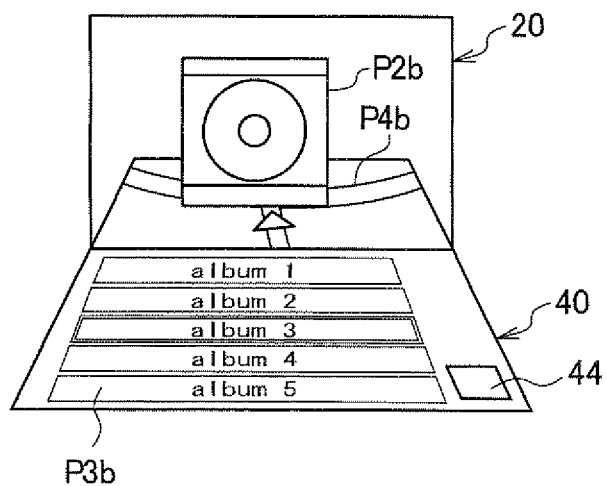

FIG. 15 illustrates an example of images that the image display device 100C displays. As the images illustrated in (a) of FIG. 15, a traffic control sign P2a as a floating image, a map P1a as a near-side direct-view image, audio information P4a as a far-side direct-view image, such as the name of a piece of music being reproduced, the name of an artist, an image of a sleeve, and the like, are displayed. Specifically, in the direct-view images illustrated in (a) of FIG. 15, different images that are not associated with each other are displayed at the front side and back side, respectively.

In such a situation, for example, in order to change the piece of music being reproduced to another piece of music, when the viewer H pushes down a switch button 44 on the image screen 41, it is detected by the sensor unit. This results in that, as illustrated in (b) of FIG. 15, the near-side direct-view image and the far-side direct-view image are replaced with each other so that the image display device 100C displays the audio information P3b as the near-side direct-view image, the map P4b as the far-side direct-view image, and the image P2b of the sleeve as the floating image. Furthermore, a piece of music to be changed can be selected from an album list displayed in the near-side audio information P3b. As described above, the switch between the near-side and far-side direct-view images, selection of an album, or the like can be functioned as operations of the viewer H from the sensor unit.

Note that, in the image display device 100C, the sensor unit is mounted on the image screen 41, but not limited thereto. A position detection sensor for detecting a viewer H's touch of the floating image (a position coordinate in the imaging plane 30) or a position detection sensor for detecting a viewing position of the viewer H (a distance from the imaging plane 30) can be mounted on a preset position of a housing (not shown). When such a sensor unit is mounted, it is possible to change the floating image and the direct-view image according to the operating position and the viewing position of the viewer H. For this reason, it is possible to bring the image display device to have interactive abilities.

As described above, the image display unit 100 according to the embodiment of the present invention includes:

the display unit 10 provided with the image screen 11 that displays two-dimensional images;

the image transfer panel 20 located to be spaced from the display unit 10;

floating image display means 1 that focuses light left from the image screen 11 on the imaging plane 30 in a space to thereby display a floating image, the space being located across the image transfer panel 20 from the display unit 10; and direct-view image display means 2 including:
a display unit 40 provided with the image screen 41 on a plane orthogonal or oblique to the imaging plane 30 from a periphery of the imaging plane 30 and adapted to output, in the first direction d1 far from the image transfer panel 20 and in the second direction d2 close thereto, two-dimensional images, respectively; and
a reflection and pass unit 50 located close to the image transfer panel 20 and adapted to:
reflect some of the light left from the image display unit 40 in the second direction d2 toward the direction d3 far from the image transfer panel 20; and
allow some of light left from the display unit 10 to pass therethrough.

Thus, the interlock between the direct-view image and the floating image is increased, making it possible to enhance stereoscopic visual effects.

The embodiment of the present invention has been described, but the present invention is not limited to the embodiment. The embodiment of the present invention can be subjected to various modifications and deformations within the scope of the subject matter of the present invention. The embodiment with the deformations or modifications can be within the scope of the present invention.

The invention claimed is:

1. An image display device comprising:
a first display unit having a first image screen for displaying a first two-dimensional image;
an image transfer panel located far from the first image screen;
a floating image display means that focuses first light left from the first image screen on an imaging plane in a space to thereby display a floating image, the space being located across the image transfer panel from the display unit; and
a direct-view image display means including:
a second display unit having a second image screen on a plane inclined to the image plane and adapted to output, in a first direction far from the image transfer panel and in a second direction close thereto, second light and third light to be displayed as second and third two-dimensional images, respectively; and
a passing and reflecting unit located close to the image transfer panel and adapted to:
reflect part of the third light left from the second display unit in the second direction toward a third direction far from the image transfer panel; and
allow part of the first light left from the first display unit to pass therethrough,
wherein the passing and reflecting unit has a light passing and reflecting surface that the part of the third light left from the second display unit and the part of the first light left from the first display unit enter, and an angle formed between the light passing and reflecting surface of the passing and reflecting unit and the second image screen is set to be a right angle.

2. The image display device according to claim 1, wherein the passing and reflecting unit has a light passing and reflecting surface that the part of the third light left from the second display unit and the part of the first light left from the first display unit enter, and an angle formed between the light passing and reflecting surface of the passing and reflecting unit and the second image screen is set to be any one of an obtuse angle and an acute angle.

3. The image display device according to claim 1, wherein the passing and reflecting unit has a light passing and reflecting surface that the part of the third light left from the second display unit and the part of the first light left from the first display unit enter, and an angle formed between the light passing and reflecting surface of the passing and reflecting unit and the second image screen is configured to be variable.

4. The image display device according to claim 1, wherein the image transfer panel and the passing and reflecting unit are located to be adjacent to each other.

5. The image display device according to claim 1, comprising:
a image display control means that carries out at least one of:
change of at least one of the second and third two-dimensional images displayed by the second display unit with change in the first two-dimensional image displayed by the first display unit, and
change of the first two-dimensional image displayed by the first display unit with change in at least one of the second and third two-dimensional images displayed by the second display unit.

6. The image display device according to claim 5, further comprising:
a position detection means that detects a position of at least part of a viewer, wherein:
the image display control means changes at least one of the first two-dimensional image displayed by the first display unit and at least one of the second and third two-dimensional images displayed by the second display unit according to the position of the at least part of the viewer detected by the position detection means.

7. The image display device according to claim 1, wherein the image transfer panel is a microlens array, the microlens array being arranged such that:
the first light left from the first image screen is incident thereto, flipped thereinside, flipped again, and thereafter outputted from the microlens array whereby the first light outputted from the microlens array is focused on the imaging plane so that an erected equal magnification image is displayed on the imaging plane as the floating image.

* * * * *